United States Patent
Pinkstock

[11] Patent Number: 5,157,988
[45] Date of Patent: Oct. 27, 1992

[54] ELASTIC CRANK FOR BICYCLES

[76] Inventor: Donald H. Pinkstock, 3220 Savage Hill Rd., Lancaster, Ohio 43130

[21] Appl. No.: 713,145

[22] Filed: Jun. 11, 1991

[51] Int. Cl.[5] .......................... G05G 1/14; F03G 1/00; B62M 1/02
[52] U.S. Cl. ...................................... 74/594.3; 74/68; 74/594.1; 74/594.2; 185/39; 280/215
[58] Field of Search ............... 74/67, 68, 594.1, 594.2, 74/594.3; 280/215, 260, 262; 185/39

[56] References Cited

U.S. PATENT DOCUMENTS

| | | | |
|---|---|---|---|
| 515,421 | 2/1894 | Chadbourne | 74/594.1 |
| 567,629 | 9/1896 | Young | 185/39 |
| 605,047 | 5/1898 | Klemm | 74/594.1 X |
| 769,594 | 9/1904 | Dould | 74/594.1 |
| 2,316,530 | 4/1943 | Nilsen | 74/594.3 |
| 2,638,359 | 5/1953 | Crumble | 280/215 |
| 3,835,729 | 9/1974 | Tarutani | 74/594.2 X |
| 4,009,621 | 5/1977 | Segawa | 74/594.2 X |
| 4,583,422 | 4/1986 | Boyd | 74/594.2 |
| 4,753,127 | 6/1988 | Baumann | 74/594.1 |
| 4,898,047 | 2/1990 | Cropek | 74/594.2 |
| 4,960,013 | 10/1990 | Sander | 74/594.2 X |
| 5,035,678 | 7/1991 | Hageman | 74/594.1 X |

FOREIGN PATENT DOCUMENTS

| | | | |
|---|---|---|---|
| 3425342 | 1/1986 | Fed. Rep. of Germany | 74/594.2 |
| 542368 | 8/1922 | France | 74/594.1 |
| 27020 | 3/1924 | France | 74/594.1 |
| 60391 | 11/1954 | France | 74/594.1 |
| 2409183 | 7/1979 | France | 74/594.2 |
| 359050 | 12/1961 | Switzerland | 74/594.2 |
| 13987 | 8/1900 | United Kingdom | 74/594.1 |
| 415636 | 8/1934 | United Kingdom | 74/594.2 |

*Primary Examiner*—Allan D. Herrmann
*Assistant Examiner*—David E. Henn
*Attorney, Agent, or Firm*—Richard C. Litman

[57] ABSTRACT

A device for absorbing energy from a bicyclist's foot on the downward pedal stroke and releasing it shortly afterward into the drive chain to propel the bicycle is disclosed. The energy is stored in a coil spring which is connected between the sprocket wheel and an adjacent crank. The sprocket wheel is fitted to a bearing on the crankshaft and is free to rotate independently of the crank except as it is restrained by the connecting spring. If the crank and the sprocket wheel rotate relative to one another away, from the equilibrium position of the spring, the spring is compressed or stretched and the resulting force causes a restoring torque. When the magnitude and angle of the force stretch the spring on the pedal stroke, the invention allows the rider's foot to move quickly through the power stroke, where great force is exerted. Less time is spent by the rider in exerting force on the pedal; this saves muscle energy, since a muscle, unlike a spring, uses energy in exerting a static force.

4 Claims, 1 Drawing Sheet

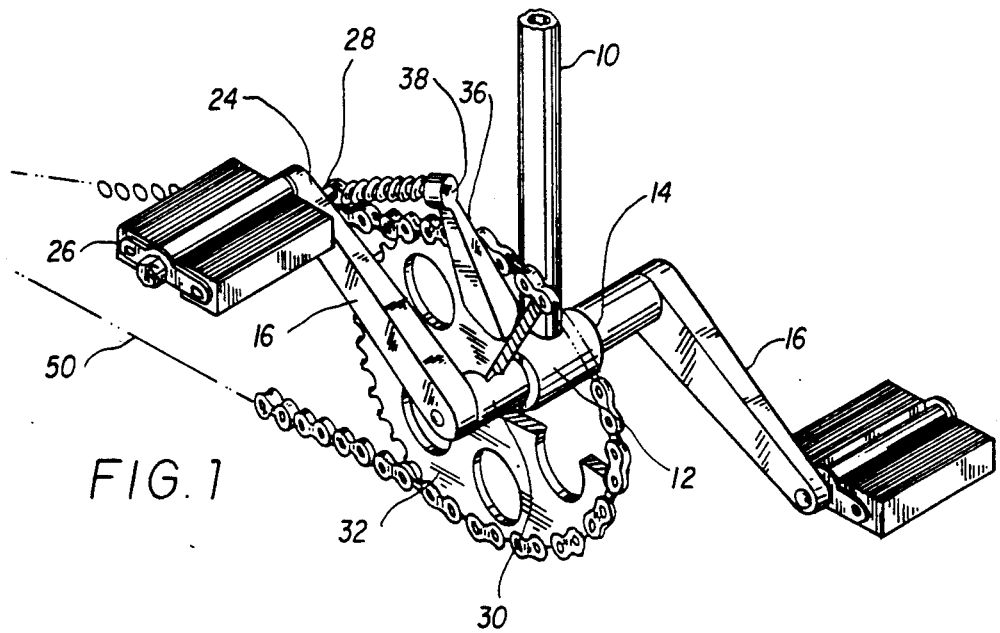
FIG. 1
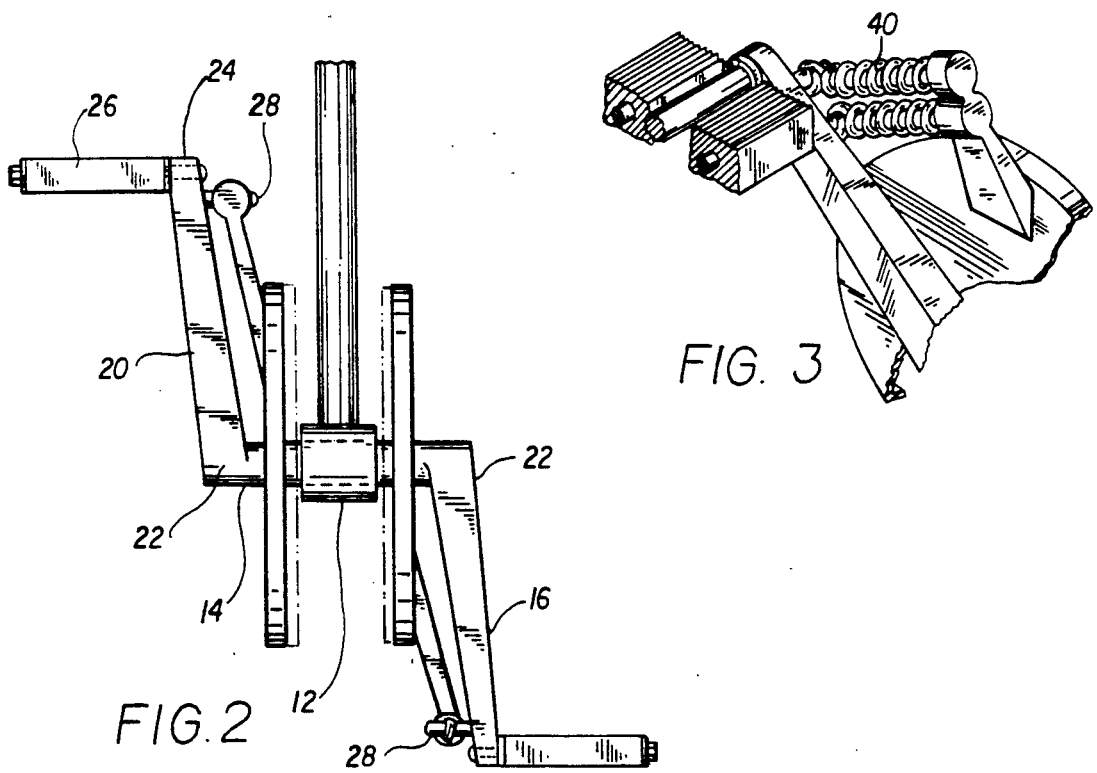
FIG. 2
FIG. 3

ELASTIC CRANK FOR BICYCLES

FIELD OF THE INVENTION

The present invention relates to variable-force bicycle sprocket drives which employ springs.

DESCRIPTION OF THE PRIOR ART

Various devices are shown in the prior art which vary the force/motion characteristics of a bicycle sprocket drive. By bicycle sprocket drive is meant a device which relates the motions of the two foot pedals, and the forces exerted upon them, to the tension and speed of the chain which drives the rear bicycle wheel.

These spring-loaded devices, which use springs or elastic elements, are to be distinguished from drives without springs, such as the commercially available drives which employ an ellipsoidal sprocket wheel. Those merely vary the mechanical advantage, and do not store energy. A spring device, in contrast, can store energy in one part of the bicyclist's pedaling cycle and release that energy in another part of the cycle.

Springs in the drive train of a bicycle are shown in various patents. A very early U.S. Pat. No. 567,629 issued to Young in 1896, shows a coil spring located inside a tubular bicycle frame member for storing energy.

U.S. Pat. No. 2,638,359 issued to J. H. Crumble shows a complex device which includes a large coiled torsion spring (like the mainspring of a watch) connecting the cranks to the sprocket wheel. Such a spring has a very low spring constant (ratio of change of force to displacement change; in this case, change in torque to angular displacement). It is suited to storing energy to be released through several revolutions, but is not "stiff" enough for storing energy in one pedal cycle. A spring is said to be stiff when it has a large spring constant.

The Crumble device is not only complex, but heavy. Any advantage of the large torsion spring in storing energy would seem to be offset by the added weight which the bicyclist must propel up hills, and which increases the rolling tire friction. Light weight is an important factor in bicycle designs.

T. W. Nilsen, is U.S. Pat. No. 2,316,530, shows a stiff coil spring connected to a bicycle's pedal crank. Unlike the usual chain drive, Nilsen's employs a crank not firmly fixed to the center sprocket wheel. His crank is pivotally attached to a point near the edge of the sprocket wheel, and is free to turn. A second pivot point is also located on the sprocket wheel edge, but diametrically opposite to the crank's pivot point; the two pivot points and the center of the sprocket wheel define a straight line. At a midpoint along the crank arm, closer to the pedal than to the pivot point, is a hinge pin. Running between this hinge pin and the second pivot point is a spring-containing member, through which the pedal force is conveyed to the sprocket wheel.

The member includes a tube containing a rod and a coil spring, and having a length adjustment. The arrangement is such that the member is incompressible, but the pedal force will pull the arm from the tube if it is great enough. This will occur when the pedal is roughly horizontal and moving downward, that is, when the torque is greatest.

The pedal on the other side, which has no sprocket, instead has a plate which mounts the two pivot points for the second crank and an identical spring-containing member.

In the Nilsen invention, which puts the origin of the crank at the edge of the sprocket wheel, the pedal will fail to describe a circular orbit whenever the member is extended. This may lead to difficulty in pedaling, since the rider's balance could be thrown off when the pedal "gives way" beneath his or her feet.

Another disadvantage is again, the added weight of the extra plate, the two members, and the various pins and pivots.

Ernest Baumann, in U.S. Pat. No. 4,753,127, shows a crank assembly which is like Crumble's in that the crank arm is resiliently joined to the sprocket, and the two are. However, Baumann uses a variety of heavy gauge bent-wire springs instead of Crumble's flat spring coiled into a helix. The wire springs' connection between the crank and the sprocket wheel involves a backing plate with various parts to hold the springs in position. The effect of the Baumann invention is to provide an elastic angular displacement between the crank and the sprocket wheel which is proportional to the torque exerted by the rider on the crank. Unlike the Nilsen device, the Baumann device allows the crank to be displaced in either direction from equilibrium, not only one direction. That is, back-pedaling force can displace the crank from the sprocket wheel just as can forward force.

Like the other inventions, the Baumann invention involves unneeded weight.

U.S. Pat. No. 4,898,047 issued to Cropek contains a highly technical but apparently faulty analysis of bicycle crank physics (confusing the concepts of work and force, and claiming generation of energy by the mechanism), and discloses a complex device which resiliently couples the crank to the sprocket wheel. As in the invention of Baumann, the crank and sprocket wheel share a center of rotation but can rotate independently. The resilient coupling device which joins them involves a bracket bolted to the sprocket wheel, which has a rod extending from it parallel to the plane of the sprocket wheel. The rod's axis is skew to the axis of rotation of the sprocket wheel and crank. A slider member fits over the rod and compresses a coil spring trapped between the end of the rod and the slider. The crank pushes against the slider to compress the spring. There are various linkage arms that limit the motions of the slider.

The Cropek invention is complicated, with four moving parts and two main stationary parts in addition to the spring, crank and sprocket wheel. This complication leads to expense, breakdown, and again, extra weight.

In sum, the prior art shows several devices which resiliently join the sprocket wheel of a bicycle to the pedal crank, in order to store energy in a spring during the high-torque downward "power stroke" part of the pedal cycle, for release when the rider's feet ease up the applied torque. This allows the rider's feet to move quickly through the high-force part of the pedal rotation. While this does not increase the physical efficiency in the sense of decreasing the energy needed to propel the bicycle, it does increase the physiological efficiency, since the leg muscles use energy while maintaining a force that is static or slowly displaced. It takes "work" in the physiological sense to maintain a force by a muscle. Therefore, it is advantageous for the rider's foot to move quickly through the high-force part of the pedal rotation. Elastic joining of the crank to the socket wheel also tends to reduce road shock.

Despite the advantages of the principle of an elastic or resilient joint between the pedal and sprocket wheel, the prior art devices are unnecessarily complex, heavy, expensive and trouble-prone.

None of the above inventions and patents, taken either singly or in combination, is seen to describe the instant invention as claimed.

Accordingly, one object of the present invention is an elastic or resilient joint between the pedal and sprocket wheel of a bicycle which is simple and inexpensive, and which is less weighty than prior designs.

Another object is a device for absorbing energy in one part of the rotation of a bicycle pedal and releasing it in another part.

These and other objects of the present invention will become readily apparent upon further review of the following specification and drawings.

SUMMARY OF THE INVENTION

The present invention is a device for absorbing energy from a bicyclist's foot on the downward pedal stroke and releasing it shortly afterward into the drive chain to propel the bicycle. The energy is stored in a coil spring which is connected between the sprocket wheel and an adjacent crank. The sprocket wheel is fitted to a bearing on the crankshaft and is free to rotate independently of the crank except as it is restrained by the connecting spring. If the crank and the sprocket wheel rotate relative to one another away, from the equilibrium position of the spring, the spring is compressed or stretched and the resulting force causes a restoring torque. When the magnitude and angle of the force stretch the spring on the pedal stroke, the invention allows the rider's foot to move quickly through the power stroke, where great force is exerted. Less time is spent by the rider in exerting force on the pedal; this saves muscle energy, since a muscle, unlike a spring, uses energy in exerting a static force.

BRIEF DESCRIPTION OF THE DRAWINGS

FIG. 1 is a perspective view of the invention, showing bicycle cranks, a sprocket wheel on a bearing for rotation about the crankshaft, the drive chain, and the spring connecting the crank to the sprocket wheel.

FIG. 2 is a frontal elevational view of an arrangement with dual sprocket wheels.

FIG. 3 shows an embodiment with multiple springs.

Similar reference characters denote corresponding features consistently throughout the attached drawings.

DETAILED DESCRIPTION OF THE PREFERRED EMBODIMENTS

The present invention is shown in overview in FIG. 1. A portion of a bicycle frame 10 includes a sleeve portion 12 adapted to hold a crankshaft 14 and bearings (not shown) in which the crankshaft 14 can rotate about a horizontal axis. The crank shaft 14 has two ends, each fitted to an arm or crank 20. Each crank 20 includes a shaft end 22 which attaches to the crankshaft 14 by threads, by sockets and pins, by splines, or other means which firmly but removably fix each crank 20 to the crank shaft 14.

The end of each crank 20 distal the shaft end is the pedal end 24. A pedal 26 is attached here.

The usual geometry is that the pedals 26 rotate on axes parallel to the axis of the crank shaft 14, and the cranks 20 are each perpendicular to the axis of the crank shaft 14, and ordinarily are generally parallel to one another.

The cranks 20 and crank shaft 14 may also be made up as one unit, or the crank shaft 14 may be combined with one of the cranks 20. Any structure is feasible which results in the correct geometry, and which allows the structure to be assembled.

the above-discussed parts are conventional in bicycles.

Disposed between the shaft end 22 of the crank 20 and the frame sleeve portion 12 is a bearing 30 on which rotates a sprocket wheel 32. The bearing 30 circles the crank shaft 14. Its function is to allow the sprocket wheel 32 to rotate about the crank shaft 14 with low friction while keeping the socket wheel 32 lying perpendicular to the axis of the crank shaft 14. The socket wheel 32 is usually a planar disc with a circular edge, having teeth to engage a chain 50 which drives the bicycle. (Sprocket wheels with non-circular outlines are not outside the scope of the present invention.) In the prior art, the sprocket wheel 32 is ordinarily fixed to the crank shaft 14 or to one crank 20.

Since the socket wheel 32 is free to rotate about the crank shaft 14, the present invention connects the socket wheel 32 and one crank 20 by a resilient, or elastic, linear force element. This may be the coil spring 40 shown in FIG. 1. The linear force element has an equilibrium length which changes when forces are exerted along its length.

The term linear force element in this specification and in the following claims means an element which changes its length this way: if compressive force is exerted upon it, its length will decrease; if tension force is exerted upon it, its length will increase. It does not respond to force components which are not colinear and directed along its length; nor does it respond to torques. A "linear force element" is not necessarily linear in shape, though it ordinarily will be. It will however have two attachment points defining a line between them, along which the force components will be aligned. Any device which will act this way can be used. In place of a coil spring a pneumatic cylinder, a solid bar of elastic material, or the like, can be employed.

A coil spring is the preferred embodiment due to its simplicity, low cost, adaptability, and efficiency. The storage of energy in a spring is typically very efficient, well over 95%, so that such energy storage does not consume the rider's energy and slow the bicycle's progress.

The spring 40 should be mounted distant from the axis of the crank shaft 14, since its leverage for transmitting torques through will be proportional to that distance. It should also be mounted so that its two ends are at roughly equal distances from the axis.

One end will be attached to the pedal end 24 of the crank 20, or near to it. The attachment may be one that allows rotation, such as the attachment illustrated in FIG. 1. A pin 28 extends from the crank 20. The end of the spring 40 is twisted into a loop perpendicular to the coils of the main body of the spring 40, like the end of screen door spring. This loop is placed over the pin 28 and held there by any convenient means, such as a groove in the pin 28.

The other end of the spring is held in a socket 38 at the end of an arm 36 mounted rigidly to the sprocket wheel 32. The coil spring 40 may be welded, brazed or epoxied into the socket 38. Alternatively, the arm 36 could include a pin like the pin 28, which would allow both ends of the spring to pivot.

Pivoting of the spring ends is not essential since a spring can bend as well as compress, and if the bends are not great no harm will result.

The function of the spring is to store energy for short periods of time. The rider, by pushing on the pedals 26, will compress the spring 40 and put energy into it. This will happen when the rider's foot is coming down, with the rider's weight on it, and the chain 50 is holding the sprocket wheel 32 from rotating. The great force of the rider's foot will compress the spring 40, and some of the energy of the rider will go into it.

The advantage of the present invention is that the rider's foot will move through the region of high force more quickly than it would if the crank 20 and the sprocket wheel 32 were rigidly attached, as in the prior art. The rider's muscles use up his or her energy when exerting a force, as well as when performing work in the physical sense by moving that force through a distance. It is common knowledge that it is tiring to lower a heavy weight as well as to raise it, and that merely holding a force with a muscle uses the body's energy. Thus, the less time that the rider's foot spends exerting a great force, the less body energy will be burned up.

As the rider quickly moves his or her foot through the down stroke, energy will be put into the spring. At the bottom of the pedal cycle, the foot can slow down; the spring 40 then extends and the stored energy is released. The rider has performed more work in a shorter time than with a prior-art bicycle. Over time, the total energy needed to propel the bicycle is the same, but the muscle work is less.

The spring 40 is capable of extension past the equilibrium point, but it will not extend thus in use because the free-wheel ratchet gear in the rear bicycle hub (not shown) prevents the chain from exerting any reverse torques on the sprocket wheel 32.

Vibration of the spring 40 will not be a problem because oscillations will be damped by the chain 50, the rider's foot, and the tires (not shown). Also, the spring 40 may advantageously be made of close coils which "bottom out" and close together if the force is high enough. This will also stop any vibration when the coils close up.

An alternate embodiment of the invention employs double sprocket wheels 14, chains 50, and springs 40, disposed adjacent either crank 20. In this embodiment, the two springs 40 act independently. Each spring is compressed once in every revolution of the crank shaft 14; in the single-spring embodiment the spring 40 is compressed twice in each revolution, once by the right foot and once by the left foot of the rider.

Another embodiment is shown in FIG. 3. Here there are two springs 40, side by side, in place of the single spring of FIGS. 1 and 2. Three or more springs could also be used.

Combination linear force elements, such as a spring in combination with a gas cylinder, and linear force elements with stops, dampers, and the like, are within the scope of the invention. In general, it is to be understood that the present invention is not limited to the sole embodiment described above, but encompasses any and all embodiments within the scope of the following claims.

The phrase "chain drive" includes drives using any flexible tensile element wrapped around a sprocket wheel to transmit force.

I claim:

1. A bicycle chain drive comprising:
   a crankshaft having a cylindrical central portion rotatably mounted to a frame for rotation about the axis of said cylindrical central portion and having two ends;
   a pair of elongated linear crank arms each having a shaft end and a pedal end, each shaft end rigidly attached to a respective one of the ends of said central portion of said crankshaft;
   a pedal rotatably attached to said pedal end, of each of said pair of elongated linear crank arms and
   a generally circular planar sprocket wheel centered on and perpendicular to the crankshaft axis, for pulling on a chain wrapped about the periphery of the sprocket wheel,
   the drive including:
   bearing means for rotatably mounting the sprocket wheel to said central portion of the crankshaft to allow free rotation of said sprocket wheel about said central portion of said crankshaft, said bearing means disposed around said central portion of said crankshaft between the frame and one crank arm; and
   an extension arm rigidly attached to and extending beyond the periphery of said sprocket wheel; an elastic spring element disposed between said one crank arm and said extension arm beyond the periphery of said sprocket wheel to control relative angular displacement between the sprocket wheel and said one crank arm as a linear function of applied torque, said elastic spring element attached to said one crank arm distal the crankshaft axis and said elastic spring element attached to the extension arm distal the crankshaft axis; whereby
   an applied force on the pedals will cause said one crank arm to be angularly displaced in the direction of said applied force relative to the sprocket wheel if the sprocket wheel is held against rotating.

2. The drive according to claim 1, wherein
   said force element is a coil spring having spring ends attached respectively to said one crank and to the sprocket wheel.

3. The drive according to claim 1 including a plurality of said elastic spring elements arranged in parallel with one another.

4. A bicycle chain drive including;
   a crankshaft having a central portion rotatably fixed to a frame for rotation about a crankshaft axis and having two ends;
   a pair of elongated linear crank arms each having a shaft end and a pedal end, each shaft end rigidly attached to a respective one of the ends of said central portion of said crankshaft;
   a pedal rotatably attached to said pedal end of each of said pair of elongated linear crank arms;
   a pair of generally circular planar sprocket wheels centered on and perpendicular to the crankshaft axis;
   a pair of chains wrapped about the respective sprocket wheels;
   a pair of bearing means for rotatably mounting the sprocket wheels to said central portion of the crankshaft to allow free rotation of said sprocket wheels about said central portion of said crankshaft, said bearing means disposed around said central portion of said crankshaft between the frame and each said crank arm; an extension arm rigidly attached to and extending beyond the periphery of each said sprocket wheel; and a pair of elastic spring elements disposed between each of said crank arms and each said extension arm beyond the periphery of a respective one of said sprocket wheels to control relative angular displacement between the sprocket wheels and said crank arms as a linear function of applied torque, said pair of elastic spring elements attached to each said crank arm distal the crankshaft axis and to each extension arm distal the crankshaft axis; whereby an applied force on the pedals will cause said crank arm to be angularly displaced in the direction of said applied force relative to the sprocket wheel if the sprocket wheel is held from rotating.

* * * * *